W. ADAMSON.
Removing Hydrocarbons from Substances which have been Treated Therewith.
No. 212,878. Patented Mar. 4, 1879.
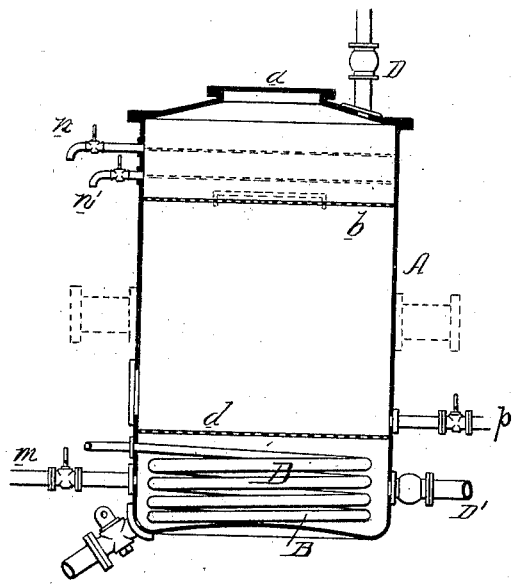

UNITED STATES PATENT OFFICE.

WILLIAM ADAMSON, OF PHILADELPHIA, PENNSYLVANIA.

IMPROVEMENT IN REMOVING HYDROCARBONS FROM SUBSTANCES WHICH HAVE BEEN TREATED THEREWITH.

Specification forming part of Letters Patent No. 212,878, dated March 4, 1879; application filed December 12, 1878.

*To all whom it may concern:*

Be it known that I, WILLIAM ADAMSON, of Philadelphia, Pennsylvania, have invented a new and useful Improvement in Removing Hydrocarbons from Substances which have been Treated Therewith, of which the following is a specification:

My invention consists of a process (fully described hereinafter) of washing from animal and vegetable substances the hydrocarbon which they retain after being treated therewith for the extraction of oils, fats, &c., and for other purposes.

Different apparatus may be employed for carrying my invention into effect. The process, for instance, may be conducted in the same vessel in which the material is treated with hydrocarbon, such as the vessel which is described and illustrated in Patent No. 118,668, granted to me September 5, 1871.

This vessel, which is shown in the accompanying drawing and marked A, is furnished with a suitable detachable cover, $a$, and with two perforated or wire-gauze diaphragms, $b$ and $d$, both extending across the interior of the vessel, one near the top and the other near the bottom of the same.

A steam-coil, B, communicating with any adjacent steam-generator, is contained in the vessel below the lower diaphragm, to vaporize the hydrocarbon, the vapor passing through the substance between the two diaphragms and out through a pipe, D, which passes through a condenser, the latter restoring the hydrocarbon to a liquid form, in which it is reconveyed to the vessel through a pipe, D'.

All the parts mentioned are shown in the said patent, and the only additional parts necessary in practicing my washing process are a pipe, $m$, to introduce water into the vessel, and one or more outlet-pipes, $n$ $n'$, two in the present instance. There may also be a pipe, $p$, through which air can be introduced into the vessel, under the circumstances explained hereinafter.

When the treatment of the material in the vessel with hydrocarbon vapor or liquid hydrocarbon has been completed, steam is cut off from the coil B, the pipes D and D' are closed, and the cover $a$ may be removed.

Water is now admitted through the pipe $m$ to the space in the vessel below the diaphragm $d$, and the cocks of the outlet-pipes $n$ $n'$ are opened.

The water permeates the material, passes upward through the same, and carries with it the hydrocarbon, the latter having a tendency to rise with the water.

As the water and whatever hydrocarbon accompanies it pass through the upper diaphragm, $b$, the hydrocarbon will at once rise to the surface, and will pass through the upper outlet-pipe, $n$, into any suitable receptacle, the water passing off through the lower outlet-pipe.

If this mode of separating the hydrocarbon from the water is practiced, the admission of water to the vessel should be such in respect to the outflow that the liquid will remain at or near a uniform level—that is, the surface of the liquid should bear the relation shown in the drawing to the upper outlet.

The water and hydrocarbon, however, may be drawn off indiscriminately into a suitable receptacle, and then separated by decantation; but it is advisable in all cases that the water should extend above the mass of material in the vessel, so that the hydrocarbon can at once rise to the surface as it escapes from the substance.

When the material is of such a character as to be closely packed and not easily displaced by the upwardly-flowing water, (and this is especially the case with seeds which have been treated with hydrocarbons,) it is necessary to agitate the mass, so that the water can gain access to every part thereof. This agitation I prefer to effect by air under pressure introduced through a pipe, $p$, although mechanical appliances may be used for the purposes.

It will be understood that the process may be conducted in a vessel separate from which the substances have been treated with hydrocarbon. A vessel similar to that shown, for instance, but without the coil and pipes D D', may be used, and may be furnished with trunnions (shown by dotted lines) and adapted to bearings, so as to be easily tilted when its contents have to be removed; or the vessel may have an opening near the lower diaphragm for the withdrawal of its contents, a suitable detachable door being adapted to the opening.

I claim as my invention—

The process herein described of washing hydrocarbons from substances which have been treated therewith, the said process consisting in causing a supply of water to pass upward through a mass of the substance contained in a vessel, and to escape therefrom with the hydrocarbons at a point above the mass, all substantially as set forth.

In testimony whereof I have signed my name to this specification in the presence of two subscribing witnesses.

WM. ADAMSON.

Witnesses:
 ALEX. PATTERSON,
 HARRY SMITH.